United States Patent [19]

Akao et al.

[11] 4,258,848

[45] Mar. 31, 1981

[54] PACKAGING MATERIAL FOR PHOTOSENSITIVE MATERIALS COMPRISING POLYOLEFIN LAYERS

[75] Inventors: Mutsuo Akao; Kenzo Kashiwagi; Koji Inoue, all of Minami-ashigara, Japan

[73] Assignee: Fuji Photo Film Co., Ltd., Minami-ashigara, Japan

[21] Appl. No.: 60,313

[22] Filed: Jul. 25, 1979

[30] Foreign Application Priority Data

Jul. 28, 1978 [JP] Japan .......................... 53/103994[U]

[51] Int. Cl.³ ..................... B32B 15/08; B32B 27/08; B32B 27/20; B32B 27/32; B65D 65/40
[52] U.S. Cl. .................................. 206/524.2; 229/53; 229/55; 428/218; 428/240; 428/244; 428/246; 428/283; 428/339; 428/340; 428/461; 428/507; 428/508; 428/509; 428/513; 428/516
[58] Field of Search ............... 428/516, 513, 509, 508, 428/507, 461, 340, 339, 283, 246, 244, 240, 218; 206/524.2; 229/53, 55

[56] References Cited

U.S. PATENT DOCUMENTS

| | | | |
|---|---|---|---|
| 3,322,613 | 5/1967 | Rasmussen | 428/518 |
| 3,445,055 | 5/1969 | Port et al. | 428/516 |
| 3,816,230 | 6/1974 | Carreras et al. | 428/218 |
| 3,973,063 | 8/1976 | Clayton | 428/195 |
| 4,022,646 | 5/1977 | Casey | 428/516 |
| 4,147,291 | 4/1979 | Akao et al. | 428/218 |

*Primary Examiner*—James C. Cannon
*Attorney, Agent, or Firm*—Sughrue, Rothwell, Mion, Zinn and Macpeak

[57] ABSTRACT

A packaging material for photosensitive materials comprising a laminate of two or more high-density polyethylene films incorporating carbon black, the films being uniaxially stretched at a draw ratio in the range of from about 2.2 to 4.2 and the stretching axis of one film forming an angle of from about 45 to 90 degrees with those of the film(s) nearest it.

14 Claims, 7 Drawing Figures

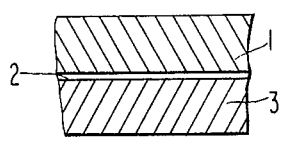
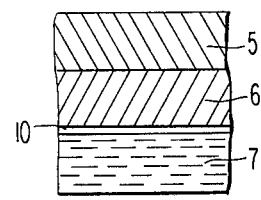
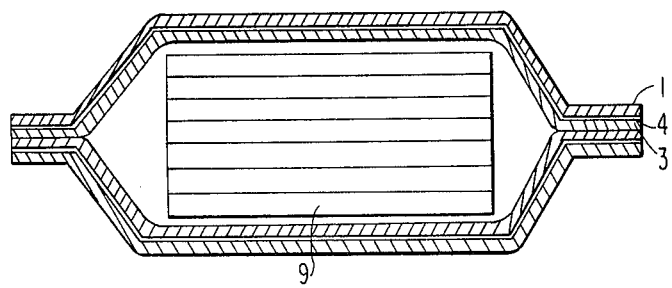
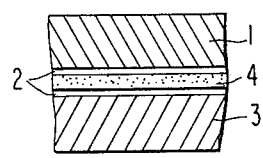
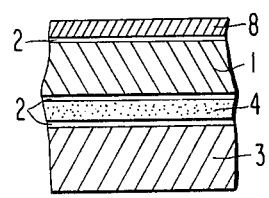
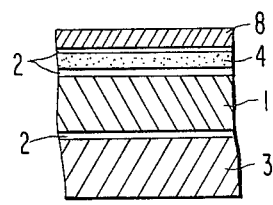

PACKAGING MATERIAL FOR PHOTOSENSITIVE MATERIALS COMPRISING POLYOLEFIN LAYERS

BACKGROUND OF THE INVENTION

1. Field of the Invention

This invention relates to a material for packaging photosensitive materials, and more particularly to a less expensive packaging material which combines, in an optimum manner, the characteristics required of a packaging material, i.e., physical strength, light-screening properties, moisture barrier characteristics, antistatic properties and heat sealability.

2. Description of the Prior Art

A photosensitive material and other materials which lose their commercial value upon exposure to light are usually packaged in a bag which completely shields them to light. The bag is required to have satisfactory breaking strength, tear strength, bursting strength, surface strength, seam strength, and other physical characteristics that vary according to the size and weight of the contents. If the bag is used to pack a photosensitive material, it is also required to have satisfactory heat sealability and heat sealing strength because it must be heat sealed to close completely the opening for light- and moisture-shielding purposes. As a further requirement, the bag must have antistatic properties that eliminate the chance of electrical charges building up due to friction between the photosensitive material and the bag and damaging the photographic material by the formation of static marks on the film.

Heretofore, a packaging bag that virtually satisfies the requirements of light-shielding performance, physical strength, heat sealability and antistatic properties has been prepared using a composite laminate wherein a low-density polyethylene film incorporating carbon black and pigments is combined with paper, aluminum foil, cellophane, etc. The current popularity of such a complex laminate as a packaging material is due to:

(1) Light-shielding performance: The low-density polyethylene film accommodates more carbon black and the like as a light screen, thus requiring only a thin film to achieve the desired light-screening effect.

(2) Moisture barrier characteristics: Because of its high air permeability, a low-density polyethylene film must be rendered significantly thick or laminated with an aluminum foil to have the desired moisture barrier characteristic. However, only a slight increase in thickness may be required of a high-density polyethylene film whose moisture permeability is about a third that of the low-density polyethylene film.

(3) Physical strength: The tear strength of the bag is increased by laminating the low-density polyethylene film with paper, incorporating a synthetic rubber in the film, or by increasing the overall thickness of the film. A packaging material for use with materials other than photosensitive materials has been prepared by knitting two kinds of high-density polyethylene flat yarns stretched in different directions (as disclosed in U.S. Pat. Nos. 3,445,055 and 3,816,230), by passing a thermoplastic film between embossing rolls to provide a mesh heat sealed pattern (as disclosed in U.S. Pat. No. 3,973,063), or by bonding, through the medium of an intermediate layer, two high-density polyethylene films stretched in different directions (as disclosed in U.S. Pat. No. 3,322,613).

(4) Antistatic properties: Addition of carbon black also results in rendering the polyethylene film antistatic. The same purpose can be achieved by laminating the film with aluminum foil.

Studies are also being made on combining two high-density polyethylene films stretched in different directions and providing the combination with light-shielding, moisture barrier and antistatic properties for use as a material for packing a photosensitive material. U.S. Pat. No. 4,147,291 entitled "Packaging Bag for Light-sensitive Material" filed by the applicant of the present application is one of the outcomes of these studies.

SUMMARY OF THE INVENTION

It is therefore a primary object of this invention to provide a packaging material for a photosensitive material which is less expensive to manufacture and combines, in an optimum manner, the physical strengths, light-shielding properties, moisture barrier characteristics, antistatic properties and heat sealability. This invention is based on the discovery of a draw ratio for high-density polyethylene films which provides an optimum balance among the various factors that determine the characteristics of the resulting packaging material, i.e., the carbon black capacity that determines the light-shielding properties, the heat sealing temperature that determines the processability of a composite film, and the breaking strength, breaking point and tear strength of stretched films that affect the overall strength of the resulting packaging material.

BRIEF DESCRIPTION OF THE DRAWINGS

FIG. 2 is a cross section illustrating one embodiment of the packaging material according to this invention.

FIG. 3 is a cross section illustrating a conventional packaging material.

FIGS. 4 to 7 are cross sections illustrating other embodiments of the packaging material according to this invention.

DETAILED DESCRIPTION OF THE INVENTION

Figure 1:
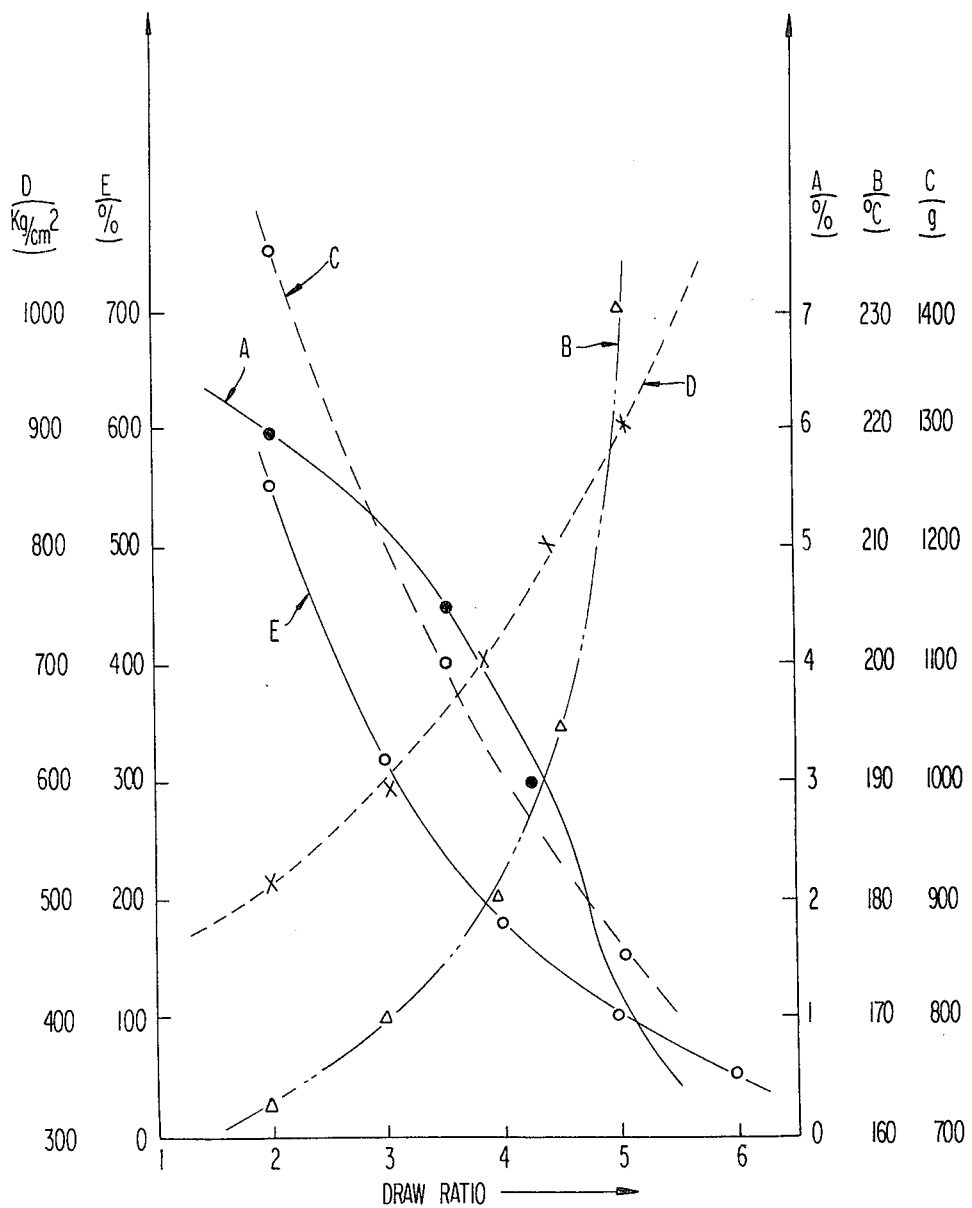
FIG. 1 is a graph showing the relationship between the draw ratio of a high-density polyethylene film and various factors that determine the characteristics of the resulting packaging material.

In FIG. 1, curves A to E illustrate the effect which a change in draw ratio has on the carbon black capacity of a high-density polyethylene film that can be stably manufactured, the heat sealing temperature, the tear strength, the breaking strength, and the breaking point, respectively.

The four properties: light-screening property, processability, physical strength, and antistatic property, that are required of a material for packaging a photosensitive material are hereunder discussed by reference to curves A to E of FIG. 1 which are curves for a 45μ thick uniaxially stretched polyethylene film having a density of 0.96 g/cm$^3$:

(1) Light-screening properties: An increase in the carbon black capacity of a high-density polyethylene film that can be stably manufactured, results in more effective light-screening function for the same thickness of film (or equivalent effectiveness for a thinner film). Curve A (where the carbon black capacity (%) is indicated on the ordinate) illustrates that to increase the content of carbon black in a high-density polyethylene film, the film is desirably stretched at a low ratio.

(2) Processability: Lower heat sealing temperature is desired for higher manufacturing efficiency of a composite packaging material, processing the material into a bag or other suitable forms, and packing a photosensitive material in the bag. Low heat sealing temperature is also desired to minimize any adverse thermal effect on the packed photosensitive material. Curve B (where heat sealing temperature (° C.) is indicated on the ordinate) illustrates that to lower the heat sealing temperature, the film is desirably stretched at a low ratio.

(3) Physical strength: Curve D (where breaking strength is plotted on the ordinate) illustrates that the higher the draw ratio, the greater the breaking strength of the stretched film. On the other hand, curve C shows that the lower the draw ratio, the greater is the tear strength of a laminate film (45μ thick as shown in FIG. 2) comprising heat sealed films stretched in different directions. Likewise, the lower the draw ratio, the larger the breaking point (indicative of resistance to a piercing object) as shown in curve E where breaking point (%) is plotted on the ordinate.

(4) Antistatic properties: The larger the carbon black content of a high-density polyethylene film that can be stably manufactured (refer to curve A), the less likely are charges to accumulate during packaging. To increase the content of carbon black in a high-density polyethylene film, the film is desirably stretched at a low ratio.

As is understood from the foregoing, a high-density polyethylene film stretched at a low ratio permits the addition of a large amount of carbon black, thus providing a packaging material with high light-shielding and antistatic properties as well as high heat sealability. In accordance with the present invention, carbon black can be added in an amount of about 0.2 to 16 g, preferably about 1.0 to 9.0 g per square meter of the packaging material.

This invention makes use of recent technology that permits for the first time the production of a homogeneous high-density polyethylene film at a low draw ratio. The production of homogeneous high density polyethylene films at a low draw ratio has been obtained using the apparatus which is fully described in Japanese Patent Publication No. 38621/72 which is incorporated herein by reference. A homogeneous high density polyethylene film with a low draw ratio is produced by forming a pipe-like material while applying force in a direction at right angles to the pipe longitudinal axis, in other words by twisting the pipe-like material, and if desired by lengthwise cutting the pipe-like material, instead of conventional stretching. In this case a diagonally stretched film is produced.

The packaging material for photosensitive materials according to this invention is produced by uniaxially stretching at a draw ratio between about 2.2 to 4.2 and preferably about 2.5 to 3.5 a high-density polyethylene film incorporating a predetermined amount of carbon black, and laminating two or more of such films so that the stretching axis of one film forms an angle of from 45 to 90 degrees with that of another. Each high density polyethylene film is generally about 25 to 100μ thick and preferably about 30 to 70μ thick.

The "high-density polyethylene" as defined in this invention has a density of at least about 0.94 g/cm$^3$ and more specifically about 0.94 to 0.97 g/cm$^3$ at 23° C. When measured in accordance with ASTM-D-792.

The preferred embodiments of the packaging material according to this invention will hereunder be described in greater detail by reference to FIGS. 2 to 7.

FIG. 2 is a cross section illustrating one embodiment of the packaging material for a photosensitive material according to this invention. In FIG. 2, the reference numerals 1 and 3 each indicate a high-density polyethylene film containing 4.5% of carbon black and stretched uniaxially at a ratio of 3.5. Each film is 45μ thick, and the stretching axis of one film forms an angle of 90 degrees with that of the other. The two films are bonded with low-density polyethylene layer 2 disposed therebetween to improve adhesion.

Table 1 sets forth the numerical data on the characteristics of the above embodiment of a packaging material according to this invention as compared with the packaging material disclosed in U.S. Pat. No. 4,147,291 and shown in cross section in FIg. 3. In FIG. 3, the reference numerals 5 and 6 each represent 45μ thick high-density polyethylene film stretched at a ratio of 5.0 and bonded together by heat sealing so that the stretching axis of one film forms an angle of 90 degrees with that of another. The reference numeral 7 indicates a low-density polyethylene film 35μ thick and containing 6% of carbon black. This film is bonded to the laminate of high-density polyethylene films by means of a hot melt adhesive 10.

TABLE 1

|  | Packaging material of this invention (FIG. 2) | Packaging material disclosed in U.S. Pat. No. 4,147,291 (FIG. 3) | Testing method or criterion |
| --- | --- | --- | --- |
| Overall thickness | 100 μ | 150 μ |  |
| Light-screening Properties | A | B | JIS Z-1702 |
| Tear Strength (MD = machine direction) | A | A | JIS P-8116 |
| Tear Strength (CD = cross direction) | A | A | JIS P-8116 |
| Moisture Barrier Characteristics | B | B | JIS Z-0208 |
| Film Surface Strength | A | B | JIS Z-0200 (level I) |
| Seam Strength | A | B |  |
| Heat Sealability | B | B | whether heat seal withstands use under actual conditions |
| Heat Sealing Strength | A | B | JIS Z-1707 |

TABLE 1-continued

|  | Packaging material of this invention (FIG. 2) | Packaging material disclosed in U.S. Pat. No. 4,147,291 (FIG. 3) | Testing method or criterion |
| --- | --- | --- | --- |
| Manufacturing Cost | A | B | |

Key to symbols
A: Excellent
B: Practically applicability

As Table 1 shows, the packaging material according to this invention whose overall thickness is about 50% less than the packaging material disclosed in U.S. Pat. No. 4,147,291 (hereunder referred to as the conventional packaging material) not only features a tear strength, moisture barrier characteristics and heat sealability at levels almost equal to those of the conventional packaging material but also exhibits noticeably higher levels of light-screening property, film surface strength, seam strength and heat sealing strength. In addition, the packaging material of this invention can be manufactured at a cost at least 10% lower than in the case of the cnventional packaging material. These advantages of the packaging material of this invention are largely attributed to the difference in physical characteristics between the slightly stretched high-density polyethylene film of which the packaging material of this invention mainly consists and the hghly stretched high-density polyethylene film of which the conventional packaging material is mainly composed. To be more specific, an increase in the carbon black content of a high-density polyethylene film that can be stably manufactured results in light-screening function that will not be impaired even if the film is rendered thinner. What is more, the lower heat sealing temperature obviates the need for the low-density polyethylene layer conventionally required for heat sealing procedure, thus making a great contribution to the manufacture of a thinner composite film at a low cost.

As FIG. 4 shows, the packaging material of this invention can be processed into a bag adapted for packaging a photosensitive material 9 by directly heat sealing two slightly stretched high-density polyethylene films at a relatively low temperature of about 180° C. (preferably about 180° to 200° C.) without thermally damaging the photosensitive material. As a further advantage, the high-density polyethylene film having antistatic properties can safely withstand a constant contact or friction with the photosensitive material.

Other preferred embodiments of the packaging material according to this invention are illustrated in cross section in FIGS. 5 to 7. FIG. 5 shows a modification of the embodiment of FIG. 2 wherein an aluminum foil 4 is used to enhance the moisture barrier effect of the packaging material. FIG. 6 shows a modification of the embodiment of FIG. 5 wherein a printable flexible sheet 8 (such as a cloth, paper, cellophane, etc.) is bonded to the composite film of FIG. 5 through the medium of a low-density polyethylene layer 2. The embodiment of FIG. 6 has the advantage that the packaging material has significantly high printability. FIG. 7 shows another embodiment of the packaging material which is designed to achieve the same purpose as the packaging material illustrated in FIG. 6.

It is to be understood that the packaging material according to this invention can be modified in other ways by making a composite laminate wherein the basic structure comprising a plurality of stretched high-density polyethylene films is combined with another sheet such as a low-density polyethylene film, cloth, paper, cellophane and aluminum foil. It is also to be understood that high-density polyethylene films and other sheets described above can be bonded together not only by means of a low-density polyethylene layer but also by use of a suitable adhesive, heat sealing, or ultrasonic welding. The high-density polyethylene film containing carbon black may optionally contain in addition another light screening component such as $TiO_2$, $CaCO_3$, clay or pigment, an antistatic agent such as a surfactant, a UV absorber, an antioxidant or a lubricant.

As described hereinabove, the packaging material of this invention with its advantages over the conventional packaging material will prove very effective in practical applications.

While the invention has been described in detail and with reference to specific embodiments thereof, it will be apparent to one skilled in the art that various changes and modifications can be made therein without departing from the spirit and scope thereof.

What is claimed is:

1. A high density polyethylene film laminate comprising at least two high density polyethylene films uniaxially stretched at a draw ratio of about 2.2 to 4.2, said films being oriented such that the stretching axis of one film forms an angle of about 45° to 90° with those of the film(s) nearest it and at least one of said films containing a light-screening pigment.

2. The laminate of claim 1, wherein said light-screening pigment is carbon black.

3. The laminate of claim 1, wherein said polyethylene has a density of at least about 0.94 g/cm$^3$.

4. The laminate of claim 1 additionally comprising a layer of a low density polyethylene.

5. The laminate of claim 1 additionally comprising an aluminum foil.

6. The laminate of claim 4, wherein said high density polyethylene films are bonded to one another by means of said low-density polyethylene layer.

7. The laminate of claim 1, wherein said high density polyethylene films are bonded to one another by heat sealing.

8. The laminate of claim 1, wherein said polyethylene films are bonded to one another by a suitable adhesive.

9. The laminate of claim 1, wherein said laminate is used as a packaging material for a photosensitive material.

10. The laminate of claim 1 additionally comprising a printable flexible sheet.

11. The laminate of claim 1, wherein said laminate contains 0.2 to 16 g/m$^2$ carbon black.

12. The laminate of claim 1, wherein said laminate contains about 3.3 to 5.8% by weight carbon black.

13. The laminate of claim 1, wherein said high-density polyethylene films are the only pigment-carrying films of the laminate.

14. The laminate of claim 1, wherein said high-density polyethylene films have a thickness of about 30 to 70 microns.

* * * * *